United States Patent

[11] 3,629,516

| [72] | Inventor | Wolfgang Bogen<br>Potsdamer Strasse 23/24, 1 Berlin 37, Germany |
|---|---|---|
| [21] | Appl. No. | 825,182 |
| [22] | Filed | May 16, 1969 |
| [45] | Patented | Dec. 21, 1971 |
| [32] | Priority | May 16, 1968 |
| [33] | | Germany |
| [31] | | P 17 74 285.7 |

[54] STABLE MAGNETIC HEADS WITH HOUSING FORMED FROM PRESSURE-CAST DISH-SHAPED PARTS
2 Claims, 1 Drawing Fig.

[52] U.S. Cl. ...................................................179/100.2C, 29/603
[51] Int. Cl. .....................................................G11b 5/10, G11b 5/42

[50] Field of Search............................................ 179/100.2 C, 100.2 CH; 340/174.1 F; 346/74 MC; 29/603

[56] References Cited
UNITED STATES PATENTS

| 3,484,565 | 12/1969 | Kronfeld et al. | 179/100.2 |
|---|---|---|---|
| 3,495,048 | 2/1970 | Gooch | 179/100.2 |
| 3,521,006 | 7/1970 | Michael | 179/100.2 |

*Primary Examiner*—Bernard Konick
*Assistant Examiner*—Alfred H. Eddleman
*Attorney*—Waters, Roditi, Schwartz & Nissen

ABSTRACT: A magnetic head, which is time and temperature stable, is provided with dish-shaped metal parts forming a housing in which magnetic cores are embedded in recesses in the parts, the fiber direction of the material of the shaped parts not being interrupted by milling the recesses for the cores nor by forming of the dish-shaped configuration thereof.

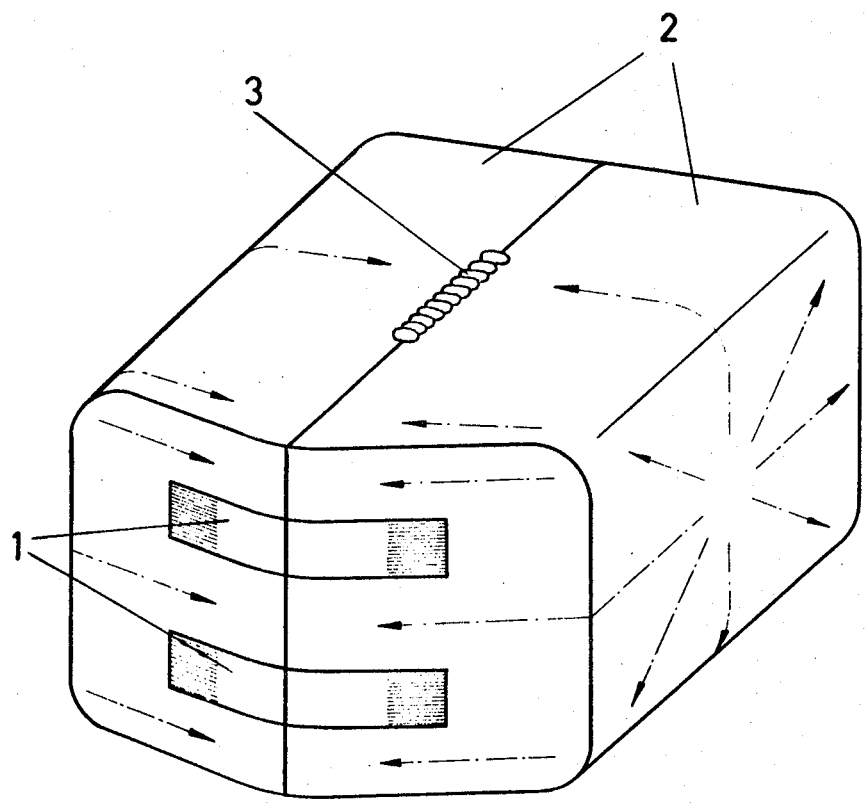

STABLE MAGNETIC HEADS WITH HOUSING FORMED FROM PRESSURE-CAST DISH-SHAPED PARTS

BRIEF SUMMARY OF THE INVENTION

The invention relates to magnetic heads and particularly magnetic heads for multiple-track recording and playback.

In such multiple-track magnetic heads, magnetic cores are embedded in shaped housings in order to position the cores fixedly and accurately with respect to each other. These shaped housings consist generally of thermoplastic materials, injection-molded alloys, sintered bodies or drawn or rolled metal. The shaped housings are generally of dished shape to improve their stability. This dished shape is easily manufactured by injection or pressure molding with the required recesses for lodging the magnetic cores.

Injection or pressure-molded shaped parts, in spite of their dished shape, nevertheless do not have the required stability and durability of shape. Even when these parts are produced by milling the dished shape from metal blanks, the shaped parts have been found to be not fully stable so that the gap between the finished magnetic heads undergoes subsequent variations whereby the recording and playback properties of the magnetic heads are unfavorably influenced. Hitherto this problem was solved to some extent only by a very complicated sintering technique with sintered magnetic cores embedded in sintered, shaped parts having the same thermal coefficient of expansion and molten with glass. Magnetic cores of sintered materials such as ferrites, however, do not achieve the magnetic values of fine laminated metal materials of nickel-iron or iron-aluminum alloys, quite apart from the fact that they are very expensive.

An object of the invention is to provide a housing of the above type which is free of the above-enumerated disadvantages and which is relatively inexpensive.

According to the invention, the stability of the shaped metal parts can be improved by directing the axis of the material fibers of the shaped parts in such a way that the fiber direction is not interrupted by the milling of the recesses nor by the constitution of the dished shape. Shaped parts with material fibers directed according to the invention can be manufactured by casting or deep drawing followed by milling to provide the recesses for the magnetic cores, the passages for the leads, etc. The wall thickness of the shaped parts must be dimensionally precise so that in order to maintain an undisturbed configuration of the material fibers, the bottom wall and sidewalls of a dish shaped part have the same material thickness. The material thickness of a shaped part is about 10 percent of the height of the magnetic head.

BRIEF DESCRIPTION OF THE DRAWING

The single FIGURE of the drawing diagrammatically illustrates, in perspective, a magnetic head in accordance with the invention.

DETAILED DESCRIPTION

In the drawing is seen a magnetic head which has magnetic cores 1 embedded in two shaped parts 2, constituting a housing. The direction of the material fibers is indicated by the arrows. Neither shaping of the parts into dished shape nor milling of the recesses into which the magnetic cores are embedded interrupts the disposition of the material fibers in the illustrated embodiment of the invention. Namely, as seen in the drawing, the fibers are all longitudinal and extend in planes parallel to the surfaces of the parts, the latter having walls of uniform thickness throughout.

The dished shape of the parts 2 defines recesses or hollows in which the magnetic cores 1 are embedded, the latter being exposed through slots formed in the front face of the parts 2 as seen in the drawing.

Both of the shaped parts 2 are inherently stable and in accordance with a further feature of the invention, they are inseparably joined to each other on the upper and lower surfaces of the magnetic head by welding or soldering. Preferably the connection of the two parts is performed by spot welding with laser beams. Such a connection is indicated at 3 in the drawing.

Magnetic heads in accordance with this invention can be produced economically and the gap dimensions are unaltered by substantial temperature differences or by long shelf life. Magnetic heads of this nature can, therefore, be produced with gap dimensions down to about 1 $\mu$m. and with an optically straight gap length of up to several centimeters without subsequent deformation of the gap.

What is claimed is:

1. A magnetic head comprising a metal housing having at least one recess, and a magnetic core in said recess; said housing including two mating parts of substantially uniform thickness throughout, said parts being formed by pressure casting into dish-shaped configuration and having their edges secured together, each said part having a portion of said recess so that with said parts secured together said portions cooperatively define said recess, the parts of said housing being pressure cast so as to form internal material longitudinal fibers extending in planes parallel to the surfaces of said housing parts uninterrupted by the shaping of said parts and forming of the recess so as to provide a housing of increased stability and resistance to distortion.

2. A magnetic head as claimed in claim 1, wherein said housing material fibers extend at right angles to the edges of said housing parts.